INVENTORS
ADRIAN J. MOSES
ROLAND M. SAMUELSON
BY Gordon Reed
ATTORNEY

INVENTORS
ADRIAN J. MOSES
ROLAND M. SAMUELSON
BY Gordon Reed
ATTORNEY

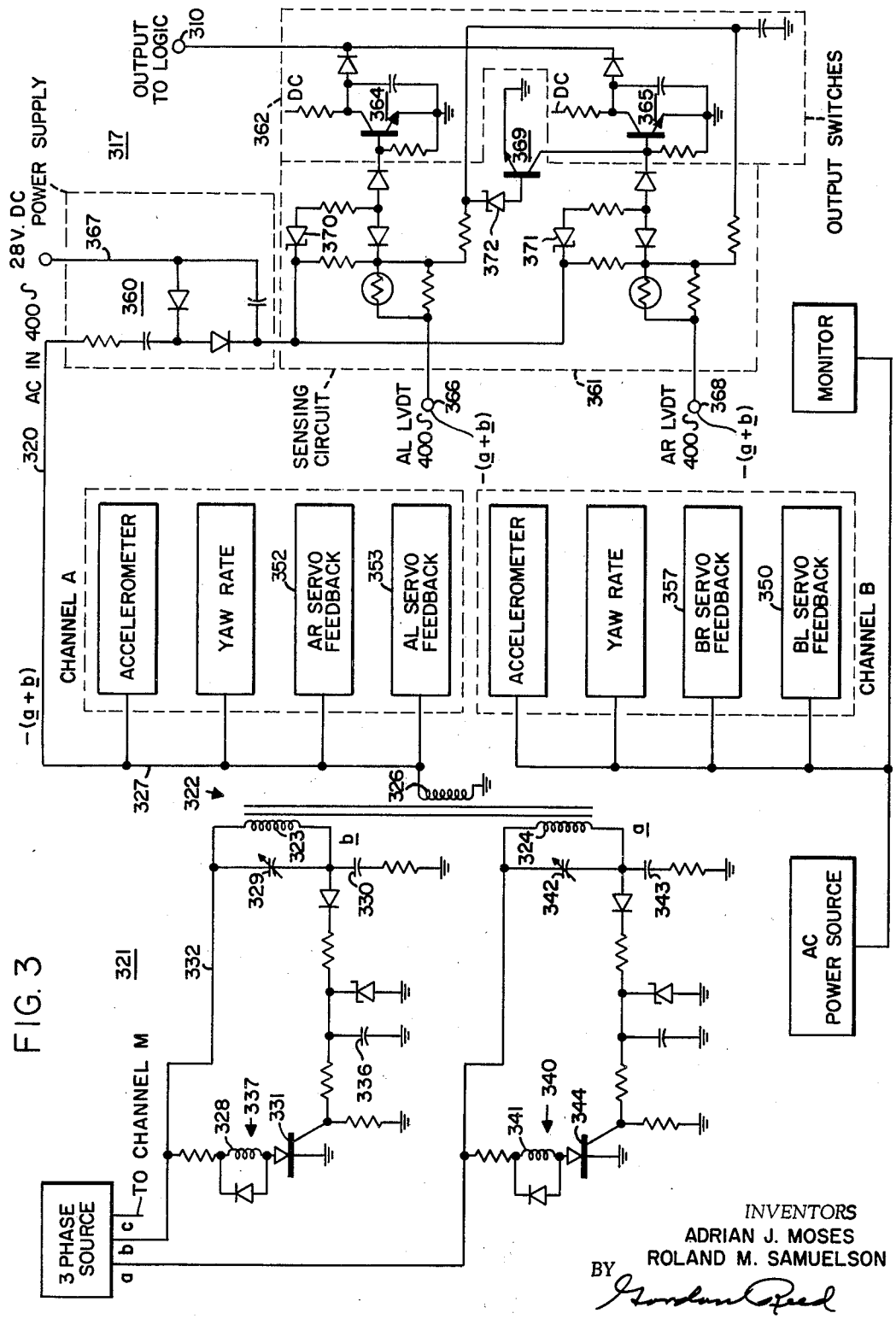

United States Patent Office 3,500,149
Patented Mar. 10, 1970

3,500,149
CONTROL APPARATUS
Adrian J. Moses, Rush City, and Roland M. Samuelson, Minneapolis, Minn., assignors to Honeywell Inc., Minneapolis, Minn., a corporation of Delaware
Filed Aug. 27, 1965, Ser. No. 483,088
Int. Cl. H02p 5/52
U.S. Cl. 318—18
12 Claims

ABSTRACT OF THE DISCLOSURE

A monitoring arrangement for condition control apparatus having redundant channels each with closed loop servo motor means, each servo motor means having initiating and rebalancing signals, the monitoring arrangement renders ineffective a redundant channel upon a malfunction in its initiating signal or rebalancing signal. The monitoring arrangement is provided by a comparison arrangement including portions of the redundant channels and a monitoring channel with the redundant channels energized through a summing-inverting transformer from two phases of a three-phase AC supply and the monitor channel being energized from the third phase of the AC supply so that the redundant channels are energized from one source of AC and the monitoring channel is energized from another source of AC but the two sources are alike in phase and magnitude. The feedback or rebalancing signals are derived from signal generators energized from the one AC source and the circuit continuity of the feedback generators are also monitored.

---

This invention relates to control apparatus for controlling a condition and more particularly relates to a stability augmentation system such as one for controlling an aircraft in flight about one of its control axis.

An object of this invention is to provide an augmentation system for controlling an aircraft with an improved arrangement for increasing the reliability of the system.

A further object of this invention is to provide an improved monitoring arrangement for increasing reliability of a control system of an aircraft.

The above and further objects and advantages of our invention will appear hereinafter from a consideration of the following description and accompanying drawings illustrating a preferred embodiment thereof.

In the drawings:

FIGURE 3 is an electrical schematic of the AC power supply transformer means.

While for purposes of illustration we have shown our invention applied to the yaw channel of an aircraft, it is to be understood that it is also applicable either to the pitch channel or to the roll channel control system of the craft using a condition control device.

The yaw axis control system to be described consists of a dual channel yaw stability augmentation system, the dual channel consisting of a channel A and a channel B. These two channels along with an M channel, monitor the operation of the system. The monitoring action herein involves the monitoring of the AC power supply to the control system, the monitoring of the relative operation of the servo motors that position control devices for controlling the aircraft about an axis thereof, the monitoring of the circuit continuity of servo feedback signal generators, and a provision for monitoring the control signals applied to such servo motors.

The invention disclosed herein is an improvement over a prior monitoring arrangement such as that described in the U.S. Patent 3,351,315 dated Nov. 7, 1967 of Earl W. Carson et al.

This invention is an improvement in the Carson et al. monitoring arrangement, such improvement comprises providing the additional functions of monitoring the AC power supply for the control system and monitoring the physical structure or electrical circuit continuity of the devices or signal generators supplying feedback signals from the servo motors and including such monitoring arrangements of control signal and relative servo operation monitoring in the aforesaid Carson et al. patent.

Figure 1:
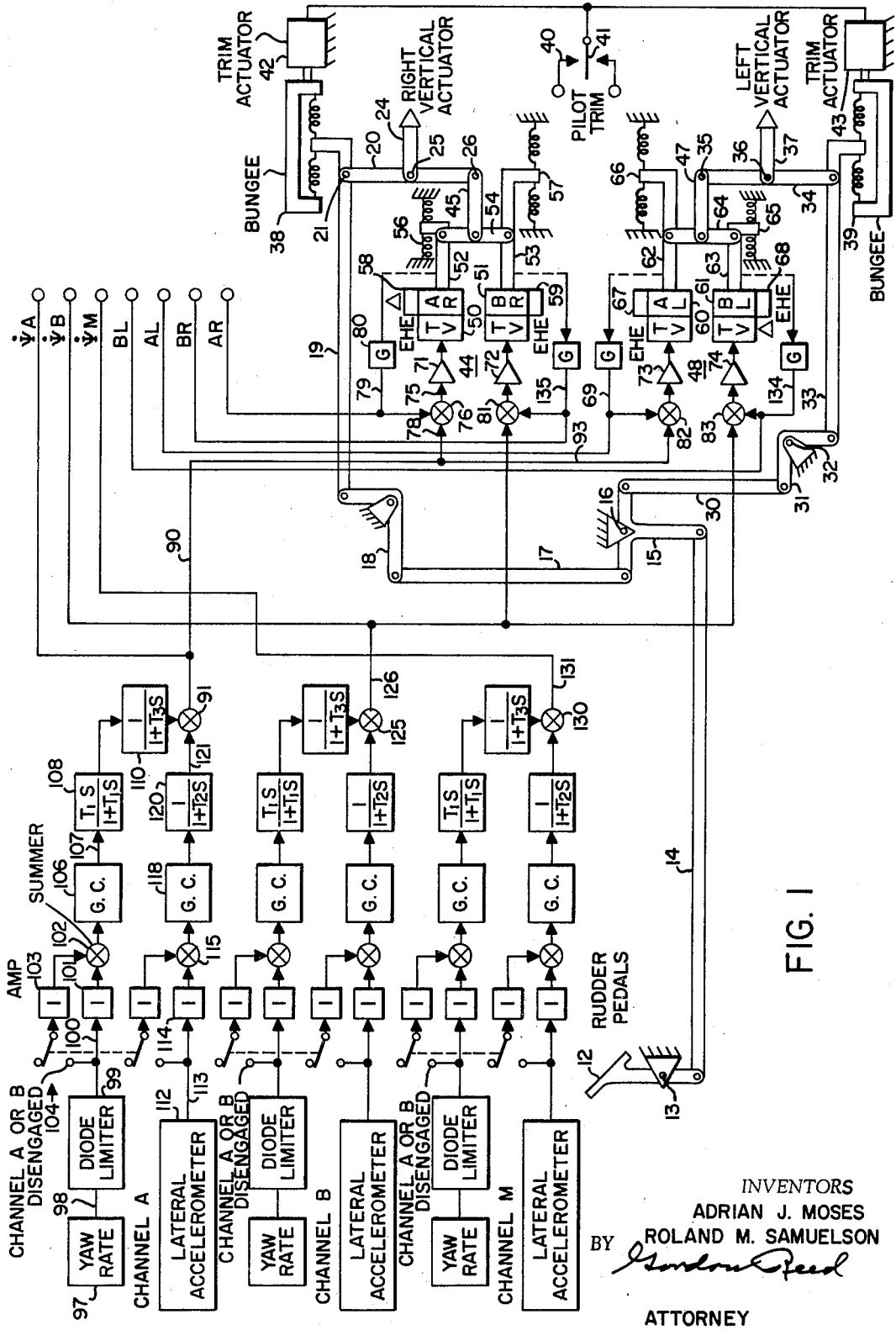
FIGURE 1 is a block diagram of a redundant channel stability augmentation system applied for example to the yaw axis of an aircraft.

The automatic, yaw axis stabilization control system herein operates differentially with the manually operable controls (rudder pedals) to control actuators that position the aircraft control surfaces. Referring to FIGURE 1, a rudder pedal such as rudder pedal 12 having pivot 13 on the craft frame operates through a link 14, three armed lever 15, upwardly extending link 17, bell crank 18, link 19, differential summing lever 20 (with pivot 26 at its opposite end), intermediate pivot 25, to output 24 which is used to position directly or through a boost actuator a right rudder of an aircraft.

The operation of lever 15 is also transmitted through downward extending link 30, bell crank 31 (having a pivot 32 mounted on the craft), link 33, differential summing lever 34 with pivot 35 at its opposite end and supporting intermediate the ends a pivot 36 for a second output member 37 which may directly or through a boost actuator position a left rudder surface of the craft.

Coacting with the differential lever 20 at pivot 26 by means of its output link 45 is a first differential or series servo arrangement 44. Similarly coacting with the second differential lever 34 at pivot 35 through its output link 47 is a second differential or series servomotor arrangement 48. The term "series" servo motor arrangement indicates that the operation of servo arrangements 44, 48 is not reflected back as to cause movement of rudder pedal 12.

Diffierential arrangement 44 comprises two fluid servomotors 50, 51 having their respective output members 52, 53 connected to opposed ends of the servo operation summing link 54 which in turn has its midpoint connected to link 45 extending to pivot 26 and thus to differential lever 20. The sermomotors 50, 51 are biased to normal centered position through an old internal spring centering arrangement illustrated for simplification here as arrangement 56, 57.

Similarly, differential arrangement 48 comprises two fluid servomotors 60, 61 with the two fluid servomotors having their respective output members 62, 63 connected to opposed ends of a link 64 having an intermediate point thereof connected to link 47 extending to pivot 35 of differential lever 34. Also, similarly, servomotors 60, 61 have respective centering means 66, 65 for centering and locking the servomotors upon such servomotor being rendered ineffective for operation.

As in the aforesaid Carson et al. patent to which reference may also be made for details, each of the servomotors is preconditioned or rendered effective for control operation, by an electrohydraulic engage valve (E.H.E.) upon energization thereof. Servomotor 50 has an engage valve 58, motor 51 has an engage valve 59, motor 60 has an engage valve 67, and motor 61 has an engage valve 68. When these servomotors are rendered effective for operation, such operation is controlled by their respective amplifiers 71, 72, 73 and 74.

Amplifier 71 receives a control signal from conductor 75 extending from a control signal summing device 76.

Summing device 76 provides a resultant signal obtained from combining several signals. One signal is obtained from conductor 78 representing responses of the craft to changes in one or more conditions while in flight, and a second or servo displacement signal on transmitting means 79 is received through a gain device 80 from displacement of the output member 52 of servomotor 50. While not shown in the figure, the signal from operation of the servomotor 50 or feedback signal is provided through a linear voltage differential transformer (LVDT), such as disclosed in FIGURE 1 of U.S. Patent 3,054,976 to Lipshutz. Similar control signal summing devices 81, 82 and 83 and sources of control signals thereto are provided for amplifiers 72, 73 and 74 respectively.

It will be noted that the same input control signal supplied by conductor 78 to summing device 76 is also supplied via subconductor 93 to signal summing device 82. Consequently there is a pair of servomotors, as 50 and 60, one in each differential arrangement 44, 48 controlled by the same input control signal, and consequently their operation should be the same. The operation of these two motors is monitored by means to be described.

The control signal on input conductor 78 is derived from the response of the craft to various flight conditions such as yaw rate and lateral acceleration of craft, and this signal to conductor 78 in turn is derived from conductor 90 extending from signal summing device 91.

Summing device 91 supplies to conductor 90 a resultant control signal from a channel A of the yaw stability augmenter apparatus. Channel A comprises a yaw rate sensing device 97, such as a conventional yaw rate responsive gyroscope, which provides on output conductor 98 an alternating signal voltage of a magnitude dependent upon the rate of change of the craft about its yaw axis and of a phase depending upon the direction of yaw of the craft. The AC power supply for the sensors such as the yaw rate sensor will be described hereinafter in detail.

The AC signal on conductor 98 is supplied through a conventional diode limiter 99 which limits the magnitude of the signal transmitted over following conductor 100 to an amplifier 101. The AC output from amplifier 101 is supplied to a summing device 102. Summing device 102 additionally receives the output of a second amplifier 103 which is connected through an automatic gain control switching arrangement 104, to conductor 100 to provide an increased gain in channel A upon a failure in channel B as will be hereinafter described.

The output from summing device 102 is supplied through a gain control device 106 having its AC output therefrom supplied by conductor 107 to an AC shaping network 108.

Thus, while the Carson et al. patent demodulated the AC control signals through its amplifier-demodulator 103 in FIGURE 1 thereof, in the subject arrangement by means of the AC shaping provisions of AC signals such demodulation is unnecessary. Such AC shaping of networks are old in the art, for example, see the U.S. Patent 3,329,910 dated July 4, 1967 of Adrian Moses.

The output from shaping network 108 is applied in turn to an aeroelastic filter 110 having its output supplied to the aforesaid summing device 91. Channel A also includes an accelerometer 112 sensing craft lateral acceleration, and it derives an AC signal of a magnitude in accordance with the magnitude of the lateral accelerations of the craft and of a phase depending upon the direction of such lateral acceleration. The output from accelerometer 112 is transmitted through conductor 113 to amplifier 114 having its AC output supplied to summing device 115 having a second input through an automatic gain changer. Summing device 115 in turn through gain control device 118, AC shaping network 120, conductor 121 is connected to summing device 91. The output of summing device 91 is $\dot{\Psi}A$, and is thus the A channel control signal. This control signal through conductor 90 and subconductor 78 through the control signal and feedback signal summing device 76 controls the A channel right servomotor 50 and through conductor 90 and summing device 82 controls the A channel left servomotor 60. Since motors 50 and 60 receive the same control signal, they should have the same displacements and monitoring means of these displacements will be described hereinafter.

The yaw stability augmenter system additionally includes as a source of control signals, a channel B having a yaw rate sensor and a lateral acceleration sensor similar to channel A and having the elements following such yaw rate sensor and lateral acceleration sensor corresponding to channel A so that the two control signals are supplied to a summing device 125. Thus the output of summing device 125 is a composite signal $\dot{\Psi}B$ which is transmitted through conductor 126 to control and feedback signal summing arrangement 81 which controls servomotor amplifier 72. Amplifier 72 controls the right servomotor 51 of the B channel. The control signal from summing device 125 is also supplied through signal summing arrangement 83 to amplifier 74 that controls the left servomotor 61 of the B channel.

As thus far described, the two redundant channels A, B jointly provide a stability augmentation system for an aircraft about its yaw axis. The arrangement for increasing the reliability of the system that involves the monitoring of the operation of the four servomotors 50, 51, 60, 61 will now be considered.

For increasing the reliability and to provide monitoring, the stabilization system includes a third channel or M channel which designation signifies a monitoring channel. This channel duplicates the yaw rate sensing device and the lateral acceleration sensing device along with the associated electronics included in the A and B channels previously described. The arrangement is such that at a summing device 130 in the M channel there is a resultant control signal $\Psi M$ applied to a conductor 131.

Consequently, since the A, B and M channels have similar sensing devices and electronics, the control signals from their summing devices 91, 125, 130 respectively $\dot{\Psi}A$, $\dot{\Psi}B$, and $\Psi M$ should be identical.

Also the displacement of servomotor 50 represented by the signal from the follow up signal conductor 79 from the servo operated LVDT represents a displacement of the right servomotor in the A channel, and this should be the same as the electrical signal derived from operation of servomotor 60 which signal is generated in the secondary winding of the LVDT and appears on the follow up conductor 69 and represents the displacement of the left motor 60 of the A channel.

In a similar manner the follow up signal on conductor 135 of the B channel right servomotor should correspond with the feedback signal on conductor 134 of the B channel left servomotor 61. The feedback signals from these four servomotors is provided in each case by means of a (LVDT) linear voltage differential transformer having its secondary winding connected in its servomotor feedback circuit. Such differential transformer supplies an AC signal and is a type of device well known in the art as typified by Lipshutz above.

The above seven signals have been used in the prior monitoring arrangement of the above Carson et al. patent. The subject arrangement supplements the monitoring of the above seven signals by additionally including in the previous monitoring arrangement with slight modification provisions for operating or controlling a monitoring arrangement from a power supply and from a linear voltage differential transformer monitoring circuit.

Figure 2:
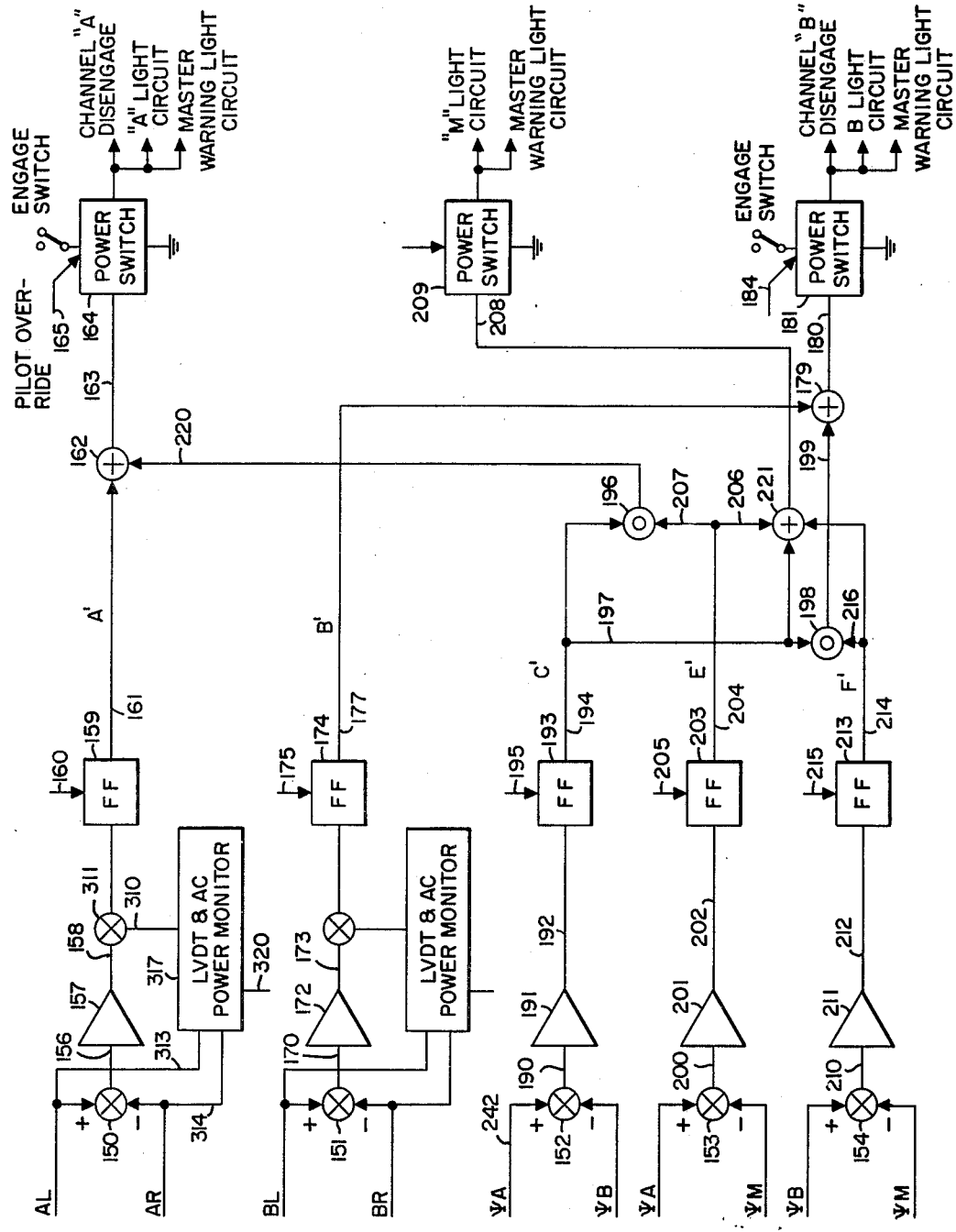
FIGURE 2 is a block diagram of the combined AC power supply—servo position—signal bridge monitor of the system.

Continuing to FIGURE 2, there are shown therein five summing devices 150, 151, 152, 153 and 154. Summing device 150 receives servo displacement or feedback AC signals AL and AR. The algebraic signs of these signals are always in opposition, and normally because the servos 50, 60 receive the same input control signal these signals are of equal magnitude but opposite in sign. The output, if any, from summing device 150 is supplied through conductor 156 to buffer amplifier 157 which may be a two stage transistor amplifier. If the two opposed signals to device 150 are equal, no input control signal or error singal is applied to conductor 156. The summing arrangement 150 and amplifier in detail may correspond with that shown in FIGURE 4 of the aforesaid Carson et al. patent.

The output from amplifier 157 is supplied by conductor 158 to a bistable device, here called a memory circuit or flip flop 159. Such bistable devices or flip flops are often used in high speed counting devices. They may be either of the transistorized type or the vacuum tube type. The output from the meomry device 159, which is a DC voltage level, is supplied over conductor 161 to a switching arrangement comprising an OR gate 162, as indicated by the + symbol. Upon actuation of the OR gate 162 due to an error signal, its operation is applied through conductor 163 to a power switch 164 which controls a main engage circuit for the two A channel servomotors. Thus upon an output of such type from OR gate 162 due to the error signal on conductor 156, both of the servomotors AL and AR are rendered ineffective, centered and locked or disengaged. In other words, the A channel is disengaged from the stabilization augmenting system. In addition to disengaging the servos indicating means such as a function selector A light (not shown) and an aircraft master warning light (not shown) are energized. The monitoring arrangement thereby shows to the pilot of the craft a faulty operation or malfunction in the A channel.

Similarly, the summing device 151 has applied thereto the B channel left and right servo displacement signals. Again if there be a difference or error signal, the difference is applied over a conductor 170 to buffer amplifier 172. Amplifier 172 in turn has its output supplied over conductor 173 to the bistable device or flip flop (FF) 174. The output from the device 174 which is in the form of a DC voltage level, due to the error signal, is applied over conductor 177 to a second OR switching logic 179. The output from the OR switching logic 179 is supplied over conductor 180 to power switch 181 causing disengagement of the B channel servomotors 51, 61, in a manner more particularly to be described.

In addition to rendering the A or B channel servomotors ineffective the gain in the unfailed channel is automatically increased through switching arrangement 104, FIGURE 1. Thus if there be a failure in the B channel, there will be a gain in the unfailed or A channel. Such increase in gain in the unfailed channel preserves the equal displacement of the rudder control surfaces for given flight condition signals from the yaw rate gyro and lateral accelerometer.

While the monitoring arrangement as thus far described in FIGURE 2 effects the monitoring of the displacement of the four series servomotors operating the two rudder surfaces, in the following, monitoring is provided for the flight condition sensors and their electronics which sensors sense flight conditions of an aircraft and supply control signals. In the sensor monitoring arrangement as distinct from the servo operation monitoring arrangement previously described, summing device 152 has supplied thereto both an A channel composite control signal and a B channel composite control signal of opposite polarity. Any difference in these signals as thus algebraically summed is supplied over conductor 190 to amplifier 191. Amplifier 191 has its DC output supplied by conductor 192 to bistable, or memory circuit, or flip flop device 193 which in turn through conductor 194 has its output supplied to a switching logic AND device 196 represented by the symbol ⊙. By means of a subconductor 197 extending from conductor 194, the output of memory device 193 is additionally supplied to an OR switching logic device 221 and to a second AND switching logic device 198.

Similarly, summing device 153 has applied thereto the composite control signal from the A channel and the composite control signal from the M channel and the difference between such signals is applied over conductor 200 to amplifier 201 having its DC output in turn supplied over conductor 202 to memory device or flip flop 203. Memory device 203 through output conductor 204 has its output supplied in one instance to the OR switching logic device 221 and through conductor 207 to the AND switching logic device 196. The output of the AND switching logic device 196 is supplied over conductor 220 to the OR switching logic device 162.

In the same manner summing device 154 has supplied thereto the B channel composite control signal and the M channel composite control signal, and any difference between the signals as algebraically summed is supplied over conductor 210 to amplifier 211 having its DC output supplied over conductor 212 to flip flop device 213. The output from the bistable device 213 is supplied over conductor 214 to the OR switching logic device 221. Device 221 as represented has three inputs and the output from the logic device 221 is transmitted over conductor 208 to the power switch 209 which controls the circuit for an M light and also a master warning light circuit of the aircraft.

Bistable device 213 which as stated has its output supply over conductor 201 to the OR switching logic device 221 also through a subconductor 216 has its output supplied to AND switching logic device 198. The output from the AND switching logic 198 is supplied by conductor 199 to the OR switching logic device 179 which in turn through conductor 180 controls the power switch 181.

The switching logic devices as represented in FIGURE 2, as implied by the terms applied to them, control the power switches 164, 181, for the servomotors and switch 209 for the M lights. Switching logic OR device 162 as represented in FIGURE 2 may be operated either from conductor 161 or conductor 220 whereas AND switching logic device 196 will not be operated unless a control is supplied concurrently from conductors 194 and 207. Similarly, the OR switching logic device 221 will supply an output if a control is supplied thereto from either one of three conductor circuits 194, 197; 204, 206; or 214. Also the AND switching logic device 198 will supply an output to conductor 199 if it is concurrently receiving a control from conductors 197 and 216.

Also the OR switching logic device 179 will supply an output if a control input is supplied thereto from either conductor 177 or conductor 199.

As thus far described the arrangement is substantially similar to that in the Carson et al. patent above, and the electrical schematic FIGURES 3, 4 and 5 thereof may be resorted to for details, with the understanding that in the subject arrangement, the demodulator portion 240 of the amplifier-demodulator in FIGURE 3 of the Carson et al. patent is omitted. Thus the AC signal summing of AL, AR and the amplification thereof provided in amplifier 157 may be effected by the structure in FIGURE 4 of the prior patent. Also the logic arrangement and master engage switch and its relay may be of the type disclosed in FIGURE 5 of the prior patent.

The present invention modifies and supplements the prior Carson et al. arrangement by providing additional monitoring provisions. Such supplementary monitoring is applied as shown in FIGURE 2 herein. FIGURE 2 of the prior arrangement and as shown herein has been modified by the addition of a LVDT-AC power supply monitor 317. This monitor 317 receives feedback circuit continuity inputs over conductors 313, 314, which have been tapped off the inputs to the summing device 150. A further input is supplied over AC power supply conductor 320 from the secondary winding of the AC power supply to be described. The output from monitor 317 is transmitted by conductors 310 to summing device 311 which receives a second input from conductor 158. A monitor similar to monitor 317 is provided in the B channel.

FIGURE 3 shows in detail an electrical schematic of the AC power supply 321 for the A channel and its associated monitor 317. A similar power supply and monitor is provided for the B channel as shown in block form. Power supply 321 comprises a transformer 322 having a pair of primary windings 323, 324 with their voltages phased 120 degrees and a secondary winding 326 connected to a buss bar 327.

The buss bar 327 thus serves to connect transformer 322 to the A channel yaw rate gyro and accelerometer and to the primary winding of the servo operated LVDT for the A channel right servo feedback; to the LVDT of the A channel left servomotor feedback; and to conductor 320 of the monitor 317.

Associated with transformer primary winding 323 is a relay 337 with an operable winding 328, a normally closed contact 329, and a normally open contact 330. Also associated with the winding 328 is an SCR 331, and included in the circuitry between one end of primary winding 323 and a control electrode of the SCR 331 are various resistors and other electronic elements. The opposite end of primary winding 323 is connected by conductor 332 to phase $b$ of a three phase AC source of supply. The arrangement is such that when conductor 332 is energized, the SCR 331 is "turned on" and becomes conducting, thereby operating relay winding 328. The operation of winding 328 opens relay contact 329 and closes the contact 330 thus supplying full energization to primary winding 323. When there is an interruption in the current through primary winding 323, from the three phase source, the SCR 331 no longer conducts and the current through relay winding 328 drops thereby resulting in the moving of the relay to an unoperated position wherein the contact 329 closes thus connecting the opposite ends of winding 323 to form a closed circuit through winding 323. In a similar manner, the primary winding 324 has a relay 340 associated therewith. Relay 340 includes an operating winding 341 having normally closed contact 342 and normally open contact 343 associated therewith. Included in the arrangement for this relay is an SCR 344 and various electronic elements comprising diode rectifier 334, a Zener diode limiter 335, and storage capacitor 336 between the control electrode of SCR 344 and one end of winding 324. The opposite end of winding 324 is connected to a phase $a$ of the three phase supply.

By means of the transformer 322 there is effected a phase addition and an inversion of the resultant of the vector voltages in phases $a$ and $b$ that are spaced 120 degress, so that the voltage in transformer secondary winding 326 corresponds with the voltage in the remaining phase $c$ of the three phase supply.

The voltage in phase $c$ of the three phase source is supplied to the yaw rate and lateral accelerometer sensors in the M channel of FIGURE 1. The voltage in secondary winding 326 of transformer 322 as stated is supplied to the yaw rate and lateral accelerometers in the A channel of FIGURE 1. Monitoring of the control signals based on the sum of $(a+b)$ and on $c$ is achieved in summing devices 153, 154 and their related components of FIGURE 2. Similarly the AC power, power supply for the B channel is energized from phase $a$ and from phase $b$.

The monitor 317 of FIGURE 3 consists of three main sections comprising a power supply section 360, a sensing circuit 361, and output switches 362 which includes switching transistors 364, 365. Inputs to the monitor 317 consist of the power supply voltage $(a+b)$ on conductor 320 supplied by transformer secondary 326, a DC 28 volt supply on conductor 367, an LVDT secondary winding continuity connection 366 for the left servo of the A channel, an LVDT secondary winding continuity connection 368 for the A channel right servomotor. Connections 366 and 368 are connected respectively to conductors 313 and 314 in FIGURE 2.

There is a monitor arrangement similar to monitor arrangement 317, for the B channel right and left servomotors with also an AC power supply source input corresponding to input connection 320.

The arrangement is such that with the system operating properly so that the sum of the phase $a$ and phase $b$ of the three phase source equal to the remaining or third phase $c$, that the transistors 364, 365 will be normally conducting so that there is no output on conductor 310 to the logic in FIGURE 2. If there is no voltage on conductor 320 as due to malfunction there will be an output on conductor 310.

The function of the monitor 317 is to monitor also the DC resistance of the feedback windings of servos AL and AR of their respective LVDT or linear differential transformers. Should there be an "open" in one or the other of the LVDT secondary windings, either the transistor 364 or transistor 365 will be no longer conducting depending on whether the AL or AR had the "open," and there will be an output on conductor 310 to the FF 159 of FIGURE 2 to disengage the A channel servos.

A similar provision is made in the B channel for power supply-LVDT failure monitoring.

The detailed operation of monitor 317 may be reviewed. Assuming that there is a full AC voltage on conductor 320, a 28 volt bias on conductor 367, and normal continuity through the LVDT on conductors 366, 368. With the AC input on 320 rectified by power supply 360 and summed with the DC voltage on conductor 367 the resultant voltage is sufficient to break down Zener diodes 370, 371 thus biasing transistors 364 and 365 into a conductive state so that monitor output conductor 310 is substantially at ground and thus no output is obtained from the monitor 317.

With an "open" in the AL LVDT and breakdown of Zener 372 controlling the base of transistor 369 the transistor is biased to conduction and thereby reduces the conduction in transistor 365 raising conductor 310 above ground so that a DC output from the DC source is applied to conductor 310. A similar result occurs when there is an "open" in the AR LVDT with transistor 365 again providing an output.

If there be a failure or no AC supply to conductor 320, neither transistor 364 or 365 is conducting and an output is supplied to conductor 310.

MONITORING OPERATION

With the four servomotors 50, 51, 60 and 61 of the A and B channels engaged by the operation of suitable switches as a manual operable switch such as switch 290, FIGURE 5 on the Carson et al. patent, the various monitoring provisions may be reviewed. Firstly, and referring to FIGURE 2, if the voltage output of the phase $c$ of the three phase source is not equal and opposite to the combined voltage from phases $a$ and $b$ of the three phase source, there will be an output from either summing device 153, 154 which is applied to the OR logic device 221 resulting in operation of the M light circuit thus indicating to the pilot that there has been a single failure in the system.

Secondly, if there be a malfunction either in phase $a$ or phase $b$ of the three phase power supply while the phase $c$ is applying its proper output, there again will be a difference in the two voltages applied to summing devices 153 and 154 and again there will be an operation of the M light circuit indicating a single failure to the pilot. However, in this situation if either the $a$ phase or the $b$ phase of the three phase source is still functioning properly, the system can still function to provide control of the two pairs of servomotors in the A and B channels.

If there be a concurrent failure in both the $a$ and the $b$ phase of the three phase source of the power supply or winding 326, then there will be no output from the power supply to combine with the 28 volt DC on conductor 367 to keep transistors 363, 364 conducting and there will be an output on conductor 310 from the LVDT–AC power supply monitor 320 which is supplied through the FF 159 to the OR circuit 162 resulting in disengagement of the A channel servomotor and the operation of the A light circuit. This will indicate to the pilot that the A channel servomotors have been disengaged.

Concurrently, with the B channel as in FIGURE 2 also having an LVDT–AC power supply monitor and also having an AC input derived from phase a and phase b of the AC power supply, the output if any of the B channel LVDT–AC power supply monitor is supplied through FF 174, conductor 177, to the OR logic 179 resulting in the disengagement of the two servomotors in the B channel. Thus on concurrent failure of the two phases a and b of the three phase power supply, the servomotors in both the A and B channels are disengaged.

Further, if there be an "open" or lack of electrical circuit continuity in the winding of either the AL servo LVDT or the AR servo LVDT feedback even though proper AC voltage is supplied to conductor 320 and 28 volts DC is supplied to conductor 367, the LVDT–AC power supply monitor 317 because of the malfunction or "open" will develop an output on conductor 365, conductor 310, which through FF 159, OR logic 162, conductor 163, etc. will result in disengagement of the A channel servomotors. A similar result occurs if the winding of the AR motor feedback has an open.

It will now be evident that there has been provided a novel AC power supply—control signal—servo position—servo feedback DC continuity monitoring and interlock arrangement for an automatic yaw stabilization system. Such system upon the presence of a differential in displacements of a left and right servomotor or two pairs of servomotors will effect the disengagement or render ineffective further operation of two aircraft surfaces from these respective servomotors. Control signals derived from aircraft flight responsive sensors are compared so that if one signal device arrangement out of three signal device arrangements sensing a similar flight condition has a different response, two servomotors associated with such one arrangement will also be rendered ineffective while two remaining servomotors operating the same aircraft surfaces have the gain in their control systems automatically increased. Also the AC power supply to the plural channels of the stabilization system and the electrical continuity in the feedback means for the servomotors are monitored so that upon failure of the AC supply or electrical continuity in feedback means of the two servomotors in a stabilization unit, such servomotors are rendered ineffective.

While but one embodiment of the invention has been illustrated and described in detail, it is to be understood that the invention is not limited thereto and that various changes can be made in the design and arrangements of the parts without departing from the spirit and scope of the invention except as limited by the subjoined claims.

We claim as our invention:

1. In a control system, a pair of automatic stabilization units, each of said units including a first electrical means for supplying an AC signal indicating a change in a condition from a normal condition and actuator mechanism adapted for actuating a condition control member for the control system in response to said AC signal, so as to stabilize the condition with respect to normal, second electrical means interconnecting said pair of stabilization units for sensing a failure in either one of said units and for modifying said first electrical means in the other of said units to increase said AC signal therefrom for increasing the actuation of said actuator mechanism associated therewith, thereby the loss of motion of the actuator mechanism in the failed unit is compensated by the increased motion of the actuator mechanism of the operating unit and means connected to each stabilization unit for energizing each stabilization unit from a three phase AC supply by electrically inverting the voltage of two phases of the three phase supply and thereafter electrically combining them so that the AC voltage resulting and supplied to the stabilization units is similar to that in the third phase.

2. The apparatus of claim 1, wherein the means to which each stabilization unit is connected comprises a transformer secondary winding which is the supply source from which the AC signals are derived, said transformer having two primary windings, one energized from one phase of a three phase supply, the other energized from a second phase of the three phase supply, so that through phase addition in the transformer the voltage in the secondary winding is similar to that in the third phase of the three phase supply.

3. The apparatus of claim 2, and means to connect the opposed ends of a primary winding of said transformer upon malfunction of its energizing circuit.

4. In a control apparatus, a power supply transformer having two primary windings and a secondary winding, one of said primary windings being energized from one phase of a three phase supply, and the other primary winding being energized by a second phase of the three phase supply so that through phase addition in the transformer the voltage in the secondary winding corresponds to that in the third phase of the three phase supply wherein the secondary winding constitutes an AC signal source for an automatic stabilization unit, and the voltage from the third phase is supplied to a monitoring unit; and
means responsive to AC signals from said three units and effective upon differences in outputs of the three units providing an output signal.

5. The apparatus of claim 4 and means for connecting opposed ends of a primary winding of the transformer upon failure of its electrical circuit.

6. In an aircraft having a control system, a pair of automatic stabilization units, each of said units including first electrical means for supplying a control signal indicating a change in a flight condition of the craft from a datum, actuator mechanism adapted for actuating the control system in response to said signals from said stabilization units so as to stabilize aircraft with respect to such condition, second electrical means interconnecting said pair of stabilization units for sensing an electrical failure in one of said units, a transformer having two primary windings and a secondary winding, one of said primary windings being energized from one phase of a three-phase supply; and the other primary winding energized by a second phase of the three-phase supply so that the voltage in the secondary winding corresponds to that in the third phase of the three-phase supply, means for connecting the secondary winding to each of said stabilization units, and means for connecting the third phase of the three-phase supply to the second electrical means.

7. In a control system having an electrical signal responsive control unit controlling the operating of two servomotors with electrical signal providing feedback means from the servomotors to balance a control signal from the unit, comparison means receiving both feedback signals for monitoring the equality in displacements of the two servomotors and further monitoring means connected to the feedback means and responsive to change in electrical resistance of either feedback means for sensing the electrical continuity of the feedback means from the two servomotors.

8. The apparatus of claim 7, wherein the monitoring means includes the means for rendering the two servomotors ineffective upon a difference in the displacements of the two servomotors.

9. The apparatus of claim 7, wherein the monitoring means includes means for rendering ineffective the servomotors upon lack of electrical continuity in the feedback means of either servomotor.

10. In a control system having a control unit controlling the operating of two servomotors with feedback means from the servomotors to balance a control signal from the unit, means for monitoring both the equality in displacements of the two servomotors and the DC electrical continuity of the feedback means from the two servomotors wherein the monitoring means comprises a power supply section, a sensing circuit section, and output switches and wherein the monitoring means is biased by a 28 volt DC input and an AC supply from the supply source for the control unit, and whereupon loss in AC power said servomotors are rendered ineffective.

11. An AC supply—electrical continuity monitor, comprising:
   an AC power supply rectifying means;
   a DC power bias suply;
   means combining the rectified AC and the DC bias;
   an output switch means comprising a pair of transistors;
   circuit means including a first Zener diode between said combining means and a first of said transistors causing conduction therein;
   circuit means including a second Zener diode between the combining means and the second transistor for causing conduction therein;
   a third Zener diode;
   a third transistor having a control junction connected to said third Zener diode;
   alternative conductive paths for the first and second Zener diodes; and
   current control means effective on an "open" in one conductive path, causing breakdown or conduction in said third Zener diode and said third transistor thereby terminating conduction in one of said transistors thus providing an output from said switch means.

12. In an AC supply—electrical continuity monitor in combination:
   means combining an AC voltage and a DC bias voltage;
   an output switch having two normally conducting transistors;
   circuit means including a first, low, inverse breakdown voltage device between said combining means and a control point of one of said transistors;
   circuit means including a second, low, inverse breakdown voltage device between said combining means and a control point of the second transistor;
   a third low, inverse breakdown voltage device;
   a third transistor controlled by conduction in said third device;
   alternative conductive paths for the first and second devices; and
   control means effective on an "open" in one alternative path for said two devices causing conduction in said third device and thus in said third transistor thereby terminating conduction in said transistor associated with the intact one of the alternative paths.

References Cited

UNITED STATES PATENTS

| | | | |
|---|---|---|---|
| 2,996,651 | 8/1961 | Hammell | 318—489 |
| 3,054,039 | 9/1962 | Meredith | 318—19 XR |
| 3,100,861 | 8/1963 | Osder | 318—489 |
| 3,351,315 | 11/1967 | Carson et al. | 318—489 XR |
| 3,395,615 | 8/1968 | Taylor | 318—489 XR |

BENJAMIN DOBECK, Primary Examiner

U.S. Cl. X.R.

318—28